UNITED STATES PATENT OFFICE.

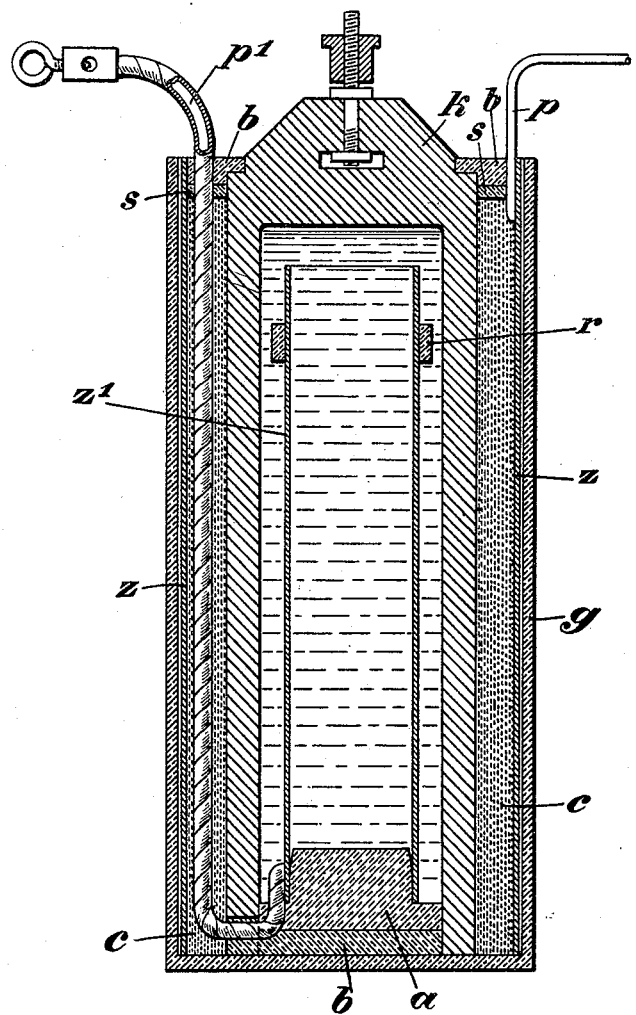

ROBERT KRAYN AND CARL KOENIG, OF BERLIN, GERMANY; SAID KRAYN ASSIGNOR TO SAID KOENIG.

GALVANIC ELEMENT.

SPECIFICATION forming part of Letters Patent No. 611,175, dated September 20, 1898.

Application filed June 19, 1897. Serial No. 641,416. (No specimens.)

*To all whom it may concern:*

Be it known that we, ROBERT KRAYN, residing at Oranienburgerstrasse, 58, and CARL KOENIG, residing at Shiffbauerdamm, 5, Berlin, in the Kingdom of Prussia, German Empire, subjects of the King of Prussia, German Emperor, have invented certain new and useful Improvements in Galvanic Elements, of which the following is a full, clear, and exact specification.

The object of this invention is to provide a dry cell with a stored fluid, the advantages being the thorough utilization of the surface of the carbon cylinder, and the construction is such that the element is composed of two completely-separated elements having a common carbon electrode, one of said elements (the outer one) being a dry cell and the other (the inner one) a wet cell.

The accompanying drawing illustrates the invention in vertical section.

It consists of the carbon cylinder $k$, an outer zinc electrode $z$, and an inner zinc electrode $z'$. The inner zinc electrode $z'$, fitted with the conducting-wire $p'$, is inserted, thoroughly insulated, into the vacant space of the carbon cylinder $k$, which is filled with electrolyte, after which the carbon cylinder is suitably closed. This carbon cylinder, which now forms a wet cell by itself, is inserted into the zinc cylinder $z$, and the space between the outer surface of the carbon cylinder and the outer zinc cylinder is filled out with an exciting-paste. The whole can be placed in an insulating vessel and the intermediate space filled out with a hermetically-closing mass.

The element composed as described is a double element. The poles $k\,p$ and $k\,p'$ generate mutually-independent sources of current. When the zinc poles $p$ and $p'$ are connected, an element of about double ampere energy is obtained, while the tension of the element when the zinc poles are connected is equal to the average of tension of the two single elements. This double element has the further advantage that the inner store of fluid penetrates the walls of the porous carbon cylinder to the same degree as the exterior exciting-paste loses its moisture, so that the outer element is constantly regenerated by the inner one, while both elements can be used separately.

The letter $a$ designates a plug made of some material which is acid-proof and a non-conductor—*i. e.*, ebonite. The letter $b$ represents a paraffin layer which is poured into the space remaining at the lower rim of the carbon cylinder with inverted position of the carbon after the inner zinc cylinder $z'$ has been inserted into the hollow of the carbon K and tightly closed by the plug $a$. This paraffin layer shuts off the hollow of the carbon and the inner zinc cylinder filled with the fluid perfectly air-tight from outside influences. The conducting-wire $p'$ is introduced from the lower end of the inner zinc cylinder through a slit provided at the lower rim of the carbon and is guided upward between the carbon cylinder and the outer cylinder. It is insulated by being covered with a silk ribbon saturated in rosin. The space between the carbon and the outer zinc cylinder $z$ is filled with the exciting-paste, which is shown in hatched lines, (designated by letter $c$.) A pasteboard disk (marked $s$) is placed upon the paste $c$, and then the space remaining at the upper rim of the outer zinc cylinder $z$ is also filled in with paraffin.

Letter $r$ designates an elastic-rubber ring which is stretched around the inner zinc cylinder $z'$ and intended to insulate the same against the carbon cylinder if the zinc cylinder should happen to come loose at the plug and topple over. The paste and the exciting fluid may be composed of any chemicals known to answer the purpose, the paste comprising, for instance, manganese peroxid and salammoniac and the exciting fluid sulfuric acid.

We claim—

In combination, the carbon cylinder $k$, the zinc cylinder $z'$ within the same and insulated therefrom by the plug $a$ which extends up into the same and has a disk extension bearing upon the carbon cylinder, the electrolyte between the said cylinders $k$ and $z'$, the outer zinc cylinder $z$ about the carbon cylinder, the said outer zinc cylinder being insulated from the inner zinc cylinder and from the carbon cylinder, and the paste electrolyte between the outer zinc cylinder and the carbon cylinder, substantially as described.

In testimony whereof we hereunto set our hands in presence of two witnesses.

ROBERT KRAYN.
C. KOENIG.

Witnesses:
CHARLES H. DAY,
HENRY HASPER.